US011553555B2

(12) United States Patent
Dalsgaard et al.

(10) Patent No.: US 11,553,555 B2
(45) Date of Patent: Jan. 10, 2023

(54) METHODS AND APPARATUSES FOR FASTER RADIO FREQUENCY ACTIVATION

(71) Applicant: Nokia Technologies Oy, Espoo (FI)

(72) Inventors: Lars Dalsgaard, Oulu (FI); Tero Henttonen, Espoo (FI); Elena Virtej, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/967,706

(22) PCT Filed: Feb. 8, 2019

(86) PCT No.: PCT/FI2019/050094
§ 371 (c)(1),
(2) Date: Aug. 5, 2020

(87) PCT Pub. No.: WO2019/158811
PCT Pub. Date: Aug. 22, 2019

(65) Prior Publication Data
US 2021/0037594 A1    Feb. 4, 2021

Related U.S. Application Data

(60) Provisional application No. 62/631,056, filed on Feb. 15, 2018.

(51) Int. Cl.
*H04W 76/34*      (2018.01)
*H04W 76/19*      (2018.01)
(Continued)

(52) U.S. Cl.
CPC ........... *H04W 76/34* (2018.02); *H04W 24/08* (2013.01); *H04W 76/15* (2018.02); *H04W 76/19* (2018.02); *H04W 76/27* (2018.02)

(58) Field of Classification Search
CPC ..... H04W 76/34; H04W 76/30; H04W 76/27; H04W 76/19; H04W 76/15; H04W 76/10;
(Continued)

(56) References Cited

U.S. PATENT DOCUMENTS 9,572,100 B2 *   2/2017   Wei ..................... H04L 5/001
10,368,393 B2     7/2019   Lunden et al.
(Continued)

FOREIGN PATENT DOCUMENTS

EP           2557877 A1     2/2013
WO    2018/037149 A1     3/2018
(Continued)

OTHER PUBLICATIONS

"Analysis of SCell Setup Delay", 3GPP TSG-RAN WG2 #99, R2-1707819, Agenda : 9.9.2, Nokia, Aug. 21-25, 2017, 5 pages.
(Continued)

*Primary Examiner* — Jean A Gelin
(74) *Attorney, Agent, or Firm* — Harrington & Smith

(57) ABSTRACT

Systems, methods, apparatuses, and computer program products for faster radio frequency (RF) activation are provided. One method may include transmitting by a network node, or receiving by a user equipment, a connection release message for the user equipment, wherein the connection release message comprises an indication for the user equipment to start measuring secondary cells after connection release. The method may then include during or immediately after connection setup or connection resume, receiving by the network node or transmitting by the user equipment, an indication of availability of measurements of the secondary cells.

20 Claims, 6 Drawing Sheets

(51) Int. Cl.
*H04W 76/15* (2018.01)
*H04W 76/27* (2018.01)
*H04W 24/08* (2009.01)

(58) Field of Classification Search
CPC .... H04W 24/08; H04W 24/10; H04L 5/0098; H04L 5/0032
See application file for complete search history.

(56) References Cited

U.S. PATENT DOCUMENTS

| | | | | |
|---|---|---|---|---|
| 10,779,232 | B1* | 9/2020 | Lunden | H04W 24/08 |
| 11,109,285 | B2* | 8/2021 | Yerramalli | H04W 36/305 |
| 2006/0183482 | A1* | 8/2006 | Ueda | H04W 36/0061 |
| | | | | 455/439 |
| 2011/0275374 | A1* | 11/2011 | Narasimha | H04W 36/08 |
| | | | | 455/436 |
| 2013/0136094 | A1* | 5/2013 | Wei | H04W 52/0203 |
| | | | | 370/329 |
| 2013/0288694 | A1* | 10/2013 | Mochizuki | H04W 72/042 |
| | | | | 455/450 |
| 2013/0315075 | A1* | 11/2013 | Tamura | H04W 24/10 |
| | | | | 370/242 |
| 2014/0057634 | A1* | 2/2014 | Chang | H04W 36/32 |
| | | | | 455/437 |
| 2014/0269354 | A1* | 9/2014 | Su | H04W 36/0088 |
| | | | | 370/252 |
| 2014/0295847 | A1* | 10/2014 | Futaki | H04W 36/0058 |
| | | | | 455/436 |
| 2015/0341148 | A1* | 11/2015 | Kazmi | H04L 5/0078 |
| | | | | 370/252 |
| 2016/0007403 | A1* | 1/2016 | Futaki | H04W 24/04 |
| | | | | 370/338 |
| 2016/0050534 | A1* | 2/2016 | Lim | H04W 64/00 |
| | | | | 370/252 |
| 2017/0055187 | A1* | 2/2017 | Kang | H04W 36/0069 |
| 2017/0359160 | A1* | 12/2017 | Ji | H04L 5/1469 |
| 2017/0359747 | A1 | 12/2017 | Lunden et al. | 28/21 |
| 2018/0007731 | A1* | 1/2018 | Park | H04W 24/08 |
| 2018/0054795 | A1* | 2/2018 | Edge | H04W 64/00 |
| 2019/0007979 | A1* | 1/2019 | Yang | H04W 74/0816 |
| 2019/0014492 | A1 | 1/2019 | Kim et al. | |
| 2019/0037425 | A1 | 1/2019 | Hong et al. | |
| 2020/0037345 | A1* | 1/2020 | Ryoo | H04W 76/10 |
| 2020/0186318 | A1* | 6/2020 | Miao | H04B 7/0626 |
| 2021/0014667 | A1* | 1/2021 | Lovlekar | H04W 88/06 |
| 2021/0084697 | A1* | 3/2021 | Damnjanovic | H04L 5/0053 |
| 2021/0092787 | A1* | 3/2021 | Bergström | H04L 5/0098 |
| 2021/0195444 | A1* | 6/2021 | Teyeb | H04W 76/15 |

FOREIGN PATENT DOCUMENTS

| | | |
|---|---|---|
| WO | 2018/083369 A1 | 5/2018 |
| WO | 2019/096888 A1 | 5/2019 |

OTHER PUBLICATIONS

"Motivation for New Work Item for Enhancing Utilization of CA for LTE", 3GPP TSG RAN Meeting #72RP, RP-161036, Agenda : 10.1.2, Nokia, Mar. 13-16, 2016, 5 pages.

"New WID for Enhancing CA Utilization", 3GPP TSG RAN Meeting #72, RP-161035, Agenda : 10.1.2, Nokia, Mar. 13-16, 2016, 8 pages.

"Motivation for New Work Item for Enhancing Utilization of CA for LTE", 3GPP TSG RAN Meeting #73RP, RP-161730, Agenda : 10.1.2, Nokia, Sep. 19-22, 2016, 5 pages.

"New WID for Enhancing CA Utilization", 3GPP TSG RAN Meeting #73, RP-161734, Agenda : 10.1.2, Nokia, Sep. 19-22, 2016, 8 pages.

"New WID on Enhancing CA Utilization", 3GPP TSG RAN Meeting #75, RP-170805, Agenda : 10.1.2, Nokia, Jun. 9, 2017, 4 pages.

U.S. Appl. No. 62/563,888, "Methods and Apparatuses for Fast Small Cell Access from Idle/Inactive State", filed Sep. 27, 2017, pp. 1-25.

"3rd Generation Partnership Project; Technical Specification Group Radio Access Network; Evolved Universal Terrestrial Radio Access (E-UTRA); Radio Resource ontrol (RRC); Protocol specification (Release 15)", 3GPP TS 36.331, 15.0.1, Jan. 2018, pp. 1-776.

"3rd Generation Partnership Project; Technical Specification Group Radio Access Network; Evolved Universal Terrestrial Radio Access (E-UTRA); User Equipment (UE) procedures in idle mode (Release 14)", 3GPP TS 36.304, V14.5.0, Dec. 2017, pp. 1-49.

"3rd Generation Partnership Project; Technical Specification Group Radio Access Network; Evolved Universal Terrestrial Radio Access (E-UTRA); Requirements for pport of radio resource management (Release 15)", 3GPP TS 36.133, V15.1.0, Dec. 2017, 2994 pages.

International Search Report and Written Opinion received for corresponding Patent Cooperation Treaty Application No. PCT/FI2019/050094, dated Apr. 25, 2019, 14 pages.

"Faster Idle Mode Measurements", 3GPP TSG-RAN WG2 #99bis, R2-1710996, Agenda : 9.9.2, Nokia, Oct. 9-13, 2017, 17 pages.

"Solutions for Wider Bandwidth Options", 3GPP TSG-RAN WG1 Meeting #88, R1-1703193, Agenda : 8.1.7, Nokia, Feb. 13-17, 2017, 12 pages.

"Discussion on the Details of Idle Mode Measurements", 3GPP TSG-RAN WG2 Meeting #101, R2-1802658, Agenda : 9.9.2, Huawei, Feb. 26-Mar. 2, 2018, 3 pages.

Tentative rejection received for corresponding Taiwan Patent Application No. 108104798, dated Feb. 14, 2020, 14 pages of Tentative rejection and 4 pages of Translation available.

Office action received for corresponding European Patent Application No. 19709766.0, dated Sep. 24, 2021, 7 pages.

* cited by examiner

METHODS AND APPARATUSES FOR FASTER RADIO FREQUENCY ACTIVATION

RELATED APPLICATION

This application was originally filed as PCT Application No. PCT/FI2019/050094, filed on Feb. 8, 2019, which claims priority from U.S. Provisional Application No. 62/631,056, filed on Feb. 15, 2018, each of which is incorporated herein by reference in its entirety.

FIELD

Some example embodiments may generally relate to mobile or wireless telecommunication systems. For instance, various example embodiments may be directed to faster radio frequency (RF) activation in telecommunication systems, such as Long Term Evolution (LTE), fifth generation (5G) or new radio (NR) systems, or other wireless systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment is directed to a method, which may include transmitting, by a network node, a connection release message to a user equipment, where the connection release message comprises an indication for the user equipment to start measuring secondary cells after connection release. The method may also include, during or immediately after connection setup or connection resume, receiving from the user equipment an indication of availability of measurements of the secondary cells.

Another embodiment is directed to an apparatus that may include at least one processor and at least one memory comprising computer program code. The at least one memory and computer program code configured, with the at least one processor, to cause the apparatus at least to transmit a connection release message, to a user equipment, comprises an indication for the user equipment to start measuring secondary cells after connection release, and, during or immediately after connection setup or connection resume, to receive from the user equipment an indication of availability of measurements of the secondary cells.

Another embodiment is directed to an apparatus that may include means for transmitting a connection release message to a user equipment, where the connection release message comprises an indication for the user equipment to start measuring secondary cells after connection release. The apparatus may also include, during or immediately after connection setup or connection resume, means for receiving from the user equipment an indication of availability of measurements of the secondary cells.

Another embodiment is directed to a method that may include receiving, by a user equipment, a connection release message from a network, where the connection release message comprises an indication for the user equipment to start measuring secondary cells after connection release. The method may also include, during or immediately after connection setup or connection resume, transmitting an indication of availability of measurements of the secondary cells.

Another embodiment is directed to an apparatus that may include at least one processor and at least one memory comprising computer program code. The at least one memory and computer program code configured, with the at least one processor, to cause the apparatus at least to receive a connection release message, from a network, comprising an indication for the apparatus to start measuring secondary cells after connection release, and, during or immediately after connection setup or connection resume, an indication of availability of measurements of the secondary cells.

Another embodiment is directed to an apparatus that may include means for receiving a connection release message, from a network, comprising an indication for the apparatus to start measuring secondary cells after connection release, and, during or immediately after connection setup or connection resume, means for transmitting an indication of availability of measurements of the secondary cells.

BRIEF DESCRIPTION OF THE DRAWINGS

For proper understanding of the invention, reference should be made to the accompanying drawings, wherein.

DETAILED DESCRIPTION

Figure 1:
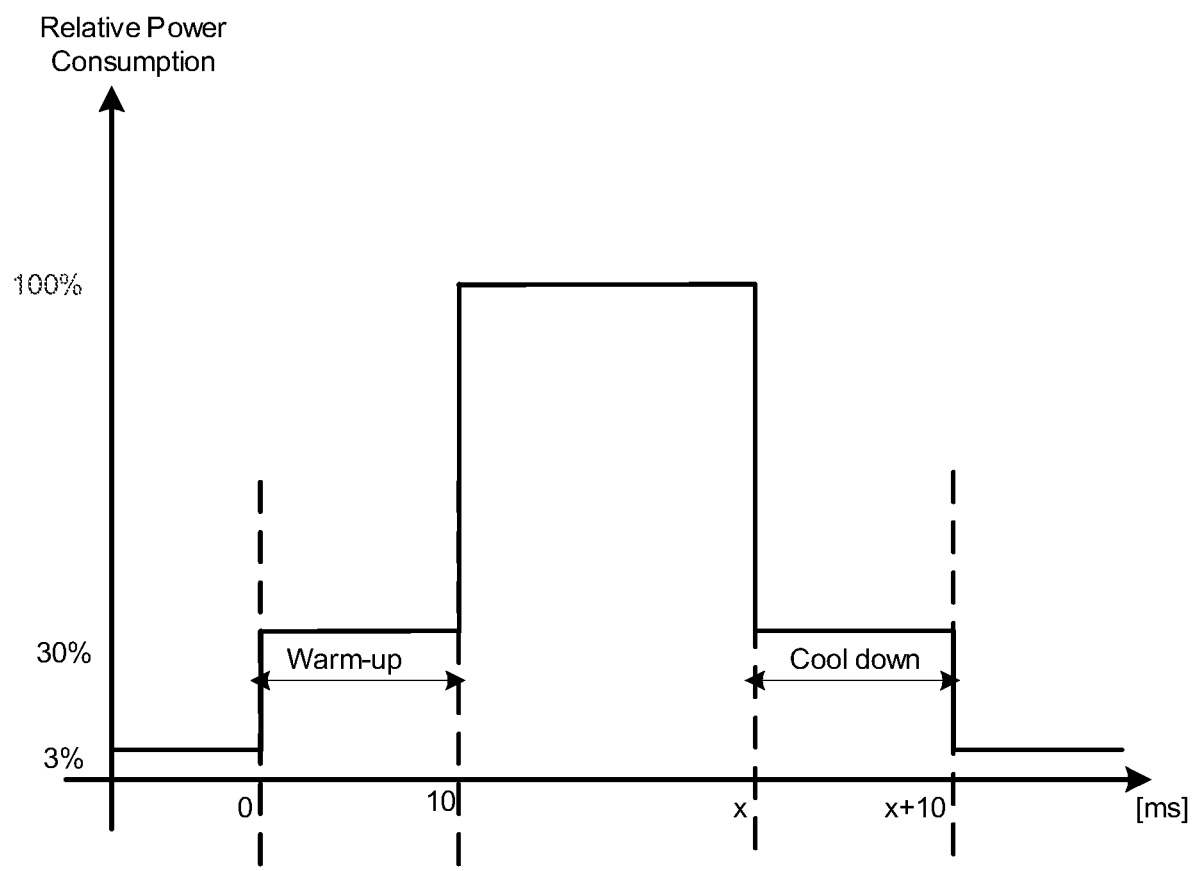
FIG. 1 illustrates an example of a UE ramping-up its RF, according to an example.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for faster radio frequency (RF) activation, as represented in the attached figures and described below, is not intended to limit the scope of certain embodiments but is representative of selected example embodiments.

The features, structures, or characteristics of example embodiments described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Some embodiments may relate to LTE and LTE-NR dual connectivity (DC) operation. Also, some example embodiments may relate to NR dual/multi-connectivity (MC) operation. For instance, example embodiments may relate to enabling a fast (small) cell access when a UE is transitioning from an idle or inactive state to a connected state or activated state, for example, to improve the latency of the carrier aggregation (CA)/DC connection setup. However, it is noted that certain embodiments are not limited to usage in LTE, but can also be applied to other wireless systems, such as 5G, NR, or any other current or future wireless system. Further, while some embodiments are described as applying to small cell access, the term "small cell" herein is used generically as example embodiments are not limited to small cells and may be applicable to any type of cell.

When the UE is in carrier aggregation/dual connectivity (CA/DC) mode, the UE may be connected to both a macro cell and one or more (small) cells at the same time, but on separate carrier frequencies. When the UE's connection is released/suspended, the UE may enter into the idle/inactive state and drop the CA/DC configuration(s). In other words, the UE may enter a single carrier operation mode, since it enables the UE to save power by not monitoring multiple carriers. This means that, when transitioning back to connected mode, the UE has no CA/DC configuration(s) and would need to be reconfigured with CA/DC again. However, such CA/DC configuration setup takes some time.

In a $3^{rd}$ generation partnership project (3GPP) Release-15 work item, it has been agreed that additional UE measurements in the idle/inactive mode are to be performed by the UE to assist the eNB in CA/DC setup, when the UE transitions back to connected mode. A motivation is to enable faster cell setup and utilization (e.g., in CA or DC sense) when needed. As a result, one key driver is to shorten the cell access (e.g. small cell access) delay components that could come from measurements, configuration and activation. Even though some examples are described herein for LTE, certain embodiments can also be applied, for example, for multi-connectivity in, e.g., NR.

In order for a UE to be able to perform measurements, at least one UE RF chain should be activated. Turning an RF chain from a start cool state to an operational state in order to perform the measurements, the UE ramps-up the at least one RF chain, fine tunes timing, etc., and then performs the measurements using the at least one RF chain. In a connected mode, if the UE is not having at least dual RF, then it may depend on measurement gaps to perform the inter-frequency measurements (as it cannot receive/transmit and perform measurements at the same time using a single RF chain).

FIG. 1 illustrates an example of how a UE may ramp-up an RF chain, where the power consumption is illustrated from the point of view of the number of transmission time intervals (TTIs) (in case of LTE) or milliseconds (ms) that it takes for the UE to wake up, perform measurements, and cool down.

In the example of FIG. 1, the power consumption during warm up and cool down is assumed to be 30% of the power consumption of the active reception (PDCCH and PDSCH) power consumption. In this example, it is assumed that this will take 10 ms before and after active period, e.g., on duration. It is also assumed, for this example, that power consumption only receiving physical downlink control channel (PDCCH) and/or performing measurements consumes same amount of the power as receiving data on physical downlink shared channel (PDSCH).

As introduced above, some embodiments described herein may focus on idle/inactive state to connected/active state transitions. When a UE is in idle, the RF is typically not on all the time. Rather, a UE is allowed to have the receiver on for performing required procedures, such as paging reception, system information block (SIB) reading and measurements, etc. In order to allow efficient UE power saving, the UE measurement requirements are defined such that they allow UE optimized power savings and, e.g., measurement requirements are developed accordingly. That means the UE is allowed to perform the inter-frequency measurements according to the requirements related inter-frequency cell selection and measurement requirements. As a result, from a system (and network) point of view it can only be assumed that the UE performs measurements on the indicated carrier according to the idle measurement requirements. There are no existing idle mode requirements for the purpose of enabling CA/DC/MC (multi-connectivity) once, for example, traffic arrives.

When traffic arrives, whether mobile originated (MO) or mobile terminated (MT), a UE will transit to a connected state, which is the state where the UE will report the measurements done while in the idle/inactive state. However, the UE may not be aware of whether the network intends to use CA/DC/MC in connected state. If this is the case, the UE needs to turn on its $2^{nd}$ RF in order to tune its receiver on SCell.

Some example embodiments address how to further reduce CA/DC/MC setup time when a UE transitions from idle/inactive mode to connected mode. By having preemptive actions, it is possible to remove the negative effect of the delay of powering on the UE's $2^{nd}$ RF chain, which, as can be seen in FIG. 1, takes approximately 10 ms, and also to reduce the overall CA/DC (or MC in NR) connection setup time by enabling early UE activation of the additional primary cell (PCell)/primary secondary SCell (PSCell)/secondary cell(s) (SCells).

Thus, one embodiment provides that, when a UE transitions from an idle/inactive state to a connected state, the UE is enabled to perform early activation of $2^{nd}$ (or more) additional RF chain(s), to perform configured additional actions, such as (e.g. small) cell measurements early, and to report its measurement results at connection setup. A resulting benefit is that when the UE is later (after measurement reporting) configured with that small cell as SCell, the activation delay can be substantially shorter.

Example embodiments will be explained in the following using LTE enhanced utilization of carrier aggregation (euCA) as use case. It should be noted, however, that certain embodiments are not limited to LTE and euCA, but should be seen as a general solution that may also be applied to other systems, such as NR and DC between LTE and NR as examples.

Figure 2:
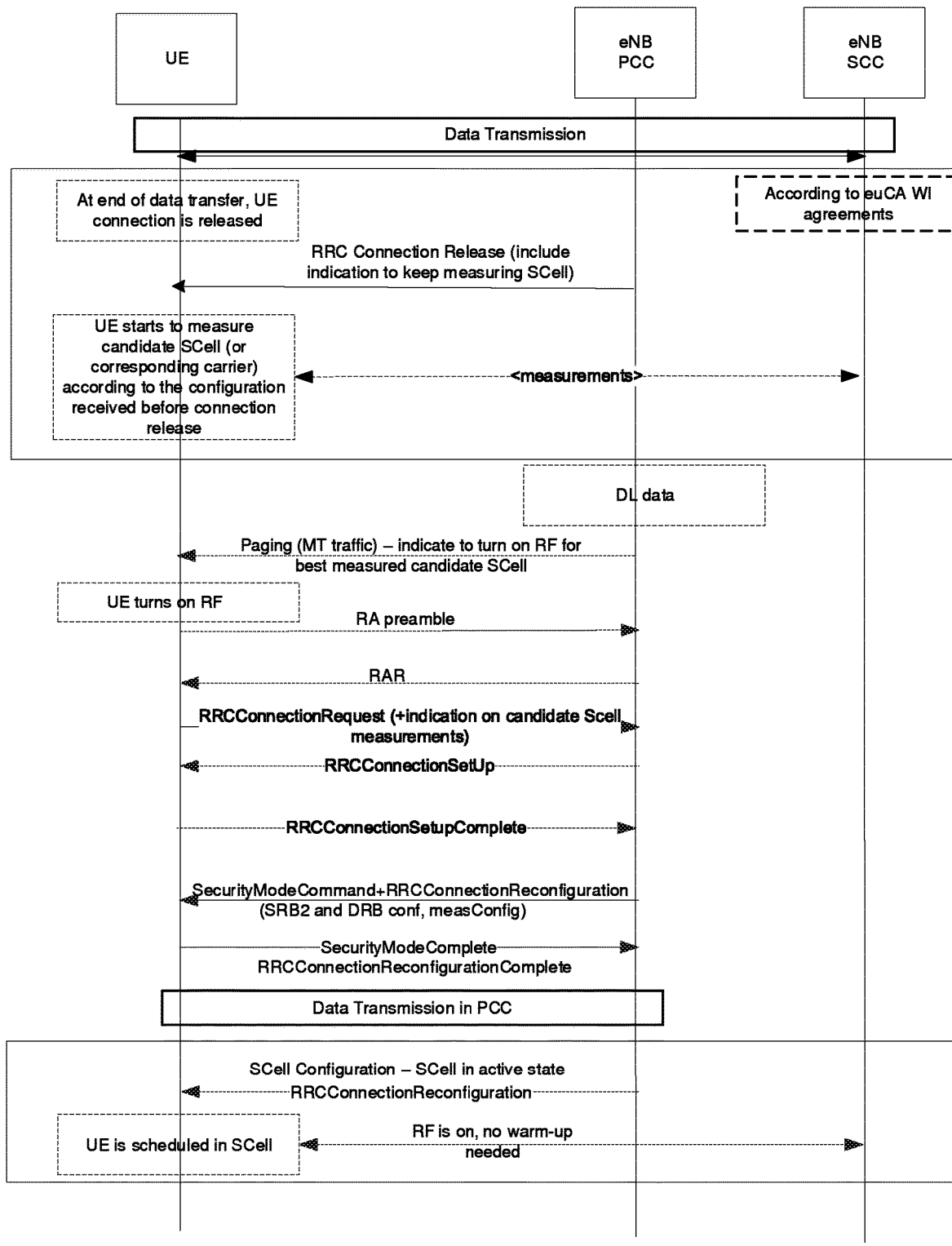
FIG. 2 illustrates an example signaling flow diagram, according to one embodiment.

In an embodiment, a UE is configured for early activation of $2^{nd}$ (or more) additional RF chain(s), for performing configured additional actions, e.g., (small) cell measurements early, and for reporting measurement results at connection setup. FIG. 2 illustrates an example signaling flow diagram, according to one embodiment. As illustrated in the example of FIG. 2, to start, the UE 201 and network, e.g., eNB 202, may be performing data transmission 210. At the end of the data transfer, the UE connection is released at 215. Accordingly, at 220, eNB 202 may transmit a RRC connection release message to the UE 201. The connection release message may include an indication to keep measuring SCell(s). Then, at 225, the UE may start to measure candidate SCell(s) (or corresponding carriers) according to the configuration received before connection release. According to certain embodiments, the SCell(s) may be measured according to the given inter-frequency measurement configuration, specific for detecting potential candidate SCells.

As further illustrated in the example of FIG. 2, at 230, eNB 202 may have DL data for transmission to the UE 201. At 235, the eNB 202 may transmit a paging message that may indicate to the UE 201 to turn on a 2K or additional RF chain. For example, the eNB 202 may indicate to the UE 201 to turn on the additional RF chain for the best measured candidate SCell(s). Alternatively, the message may indicate that the network intends to use CA/DC or may even more specifically indicate which carrier it intends to use. Such indication may then be used by the UE to decide to turn on additional RF chain. In one example, broadcasted information (e.g., in system information indication SIBS) may contain an indication of when the UE 201 can apply, for example, information on (re)activating the RF. It is noted that the network, i.e., eNB 202, does not know which candidate cell is the best, so the network may just provide the UE 201 with generic instructions. The UE 201 may then activate, at 240, the additional RF chain, and may tune and synchronize to the best measured candidate SCell(s) on the instructed carrier (before, e.g., SCell is configured).

At 245, the UE 201 may transmit a random access (RA) preamble to the eNB 202 and, at 250, may receive a random access response (RAR). During or immediately after connection setup, the UE 201 may report the cell(s) it has measured. For example, as shown at 255 of FIG. 2, the UE 201 may transmit a RRC connection request, to the eNB 202, including an indication of candidate SCell measurements. According to certain embodiments, the UE 201 may explicitly indicate the candidate cell(s), such as any cell above a given threshold, or may implicitly indicate the best reported cell. At steps 260, 265, 270, and 275, the UE 201 and eNB 202 may set up and complete RRC connection. In an embodiment, the UE 201 may indicate the availability of inter-frequency measurements in the RRC connection setup complete message 265 or in a RRC connection resume complete message.

In some embodiments, the UE 201 and eNB 202 may perform data transmission in the primary component carrier (PCC). At 285, the eNB 202 may configure the UE with the new SCell, for example, according to the reported candidate cell(s) in step 255. As a result of example embodiments, the network (e.g., eNB 202) knows that the UE is ready to be scheduled sooner in the candidate cell(s). The UE 201 is able to send channel quality indicator (CQI) report immediately and be scheduled in the SCell, at 290, without delay due to the early powering on of the RF and synchronizing to the cell.

In one embodiment, the network may, for instance, know that the UE is ready to be scheduled earlier due to an indication (e.g., in 255, 265 or 275) from the UE 201 that an additional RF chain has been activated, or due to a lack of indication that an additional RF chain has not been activated. For example, if the UE has sent a measurement report indicating (explicitly or implicitly based on measurement report of a cell on certain carrier/in certain group of cells/ certain measurement or report ID) that it is activating the $2^{nd}$ or additional RF, the network may assume that by the time it receives the report and configures the UE with an SCell, the UE is already synchronized to that cell. As another example, there may be a specific time after receipt of the measurement report when the UE is considered to be ready.

Additionally, in another embodiment, the network indication at step 235 may contain a quality condition (e.g., reference signal received power (RSRP) threshold) so that the UE 201 turns on the RF only if it has found a candidate SCell that fulfils the given quality condition. Then, during the connection setup, the UE may indicate if it did not turn on the RF or implicitly report all the candidate cells below the given quality condition. In another example embodiment, the UE may include just a report on the serving cell (PCell) without including any candidate cells.

In view of the above, according to an embodiment, in case of mobile terminated (MT) traffic, the network may indicate, for example in paging, for a UE to turn on the RF on the best measured candidate SCell. Once the indication is received, the UE may start to wake-up its RF earlier than SCell configuration (and activation). By the time of SCell activation, the UE will have its additional RF chain on and is able to start earlier data transfer with the configured activated SCell using the additional RF chain.

Example embodiments may allow for significant reduction in the SCell utilization delay as connection setup, turning on additional or secondary RF chain and performing cell detection and fine time frequency tuning using the additional or second RF chain may be done in parallel to the RRC connection setup procedures rather than after RRC connection setup.

Furthermore, certain embodiments are also applicable for mobile originated (MO) traffic, and are also applicable either for idle or connected mode (based on, e.g., network configuration or non-access stratum (NAS) triggering a service request for more bearers).

For example, in idle mode, the starting of the RRC connection setup procedure (which triggers RF activity for the UE) may trigger the measurements (i.e., UE may trigger the start of the measurements based on triggering of other procedures). The specific timing of when to start the measurements may be left up to UE implementation, but it could be based, for example, on the Non-Access Stratum (NAS) layer trigger to Access Stratum (AS) layer that causes RRC connection setup to be started. Alternatively, network configuration (e.g., in SIB or in dedicated signalling given to UE before going to IDLE) could indicate how UE should trigger the measurements when RRC connection setup procedure starts in AS layer. From UE perspective, this could be either implicit (e.g., AS layer starting RRC connection setup procedure) or explicit (e.g., NAS layer directly indicating to start measurements and RRC connection setup) indication to trigger the measurement procedure (i.e., the difference is mainly when exactly UE starts the procedure, and whether AS-NAS interaction is needed).

In connected mode, the network may configure the UE so that once the UE obtains new traffic (e.g., when new buffer status report (BSR) is triggered, the amount of data in UL buffer exceeds some predefined amount, or when NAS UL information transfer starts), the UE may activate the $2^{nd}$ or additional RF and synchronize to the best candidate SCell(s). Additionally, the UE may then report the best candidate SCell(s) to the network. This enables network to utilize the reported cell (based on the measurement results) as the network knows that the UE is synchronized to the cell and ready to receive data from it right away (which means the activation/configuration would be faster than otherwise).

Figure 3:
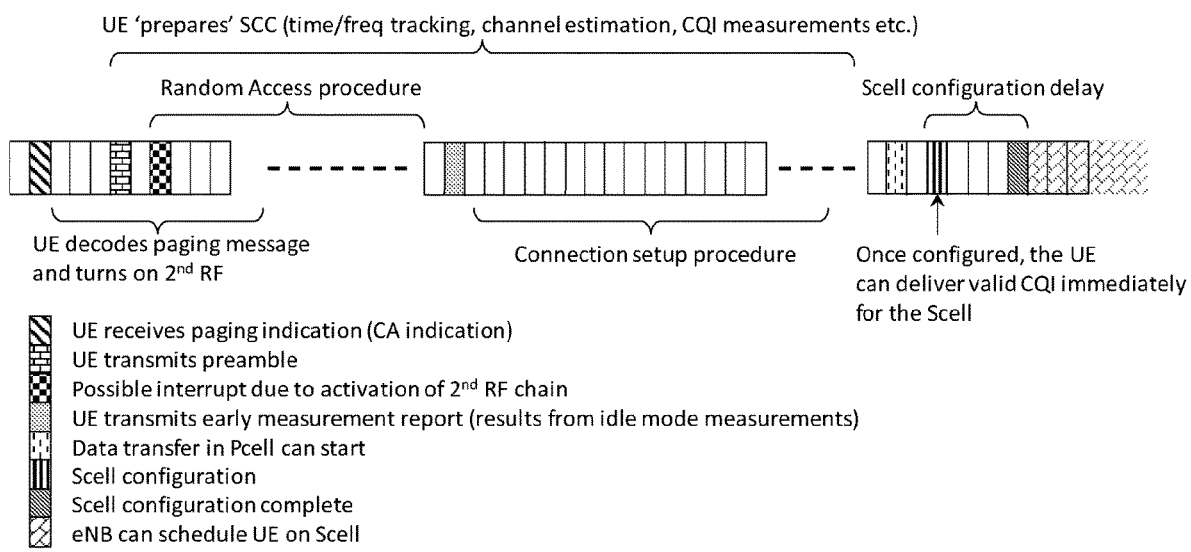
FIG. 3 illustrates an example depicting improved SCell activation delay, according to an embodiment.

FIG. 3 illustrates an example of the improved SCell activation delay, according to certain embodiments of the invention. In the example of FIG. 3, it may be considered that random access delay may take roughly 20-30 ms, connection setup may take about 16 ms, the UE 'prepares' secondary component carrier (SCC) (time/frequency tracking, channel estimation, CQI measurements etc.) in about 24 ms as it is based on early reported cell, and SCell configuration delay was considered in this example 4 ms.

From FIG. 3, it can be observed that the UE now can activate its second RF chain much earlier, than in the case of the legacy approach. The activation can start in essence right after paging is received and the message is decoded. In one example, this would be after e.g. 4 ms processing time since the decoding of paging message. The positive effect can be especially seen at the step of SCell candidate configuration (for example 4 ms delay here considered).

In one additional embodiment, the information on turning on the RF on the UE side may be such that, for a UE in idle state, the signaling for the (re)activating the RF on the UE side may be initiated from a network entity, e.g., a mobility management entity (MME). For example, in case of network initiated traffic, the MME may indicate in a paging message to eNB(s) that the UE(s) may need to turn on the RF. Correspondingly, the eNB may indicate this to the UE, for example, in a paging message as discussed in detail above.

Figure 4A:
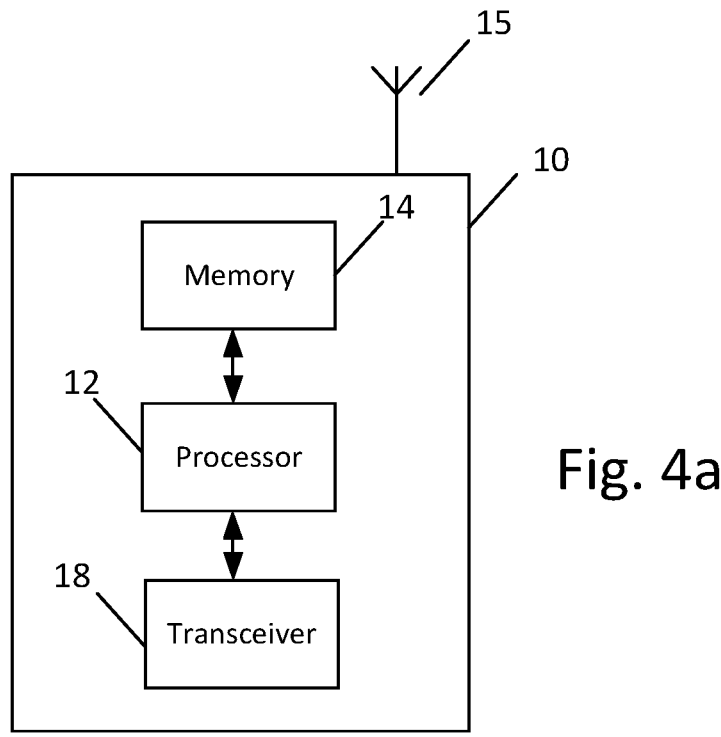
FIG. 4a illustrates an example block diagram of an apparatus, according to one embodiment.

FIG. 4a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a GSM network, LTE network, 5G or NR or other radio systems which might benefit from an equivalent procedure.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). Transceiver 18 may comprise one or more RF chains for down and/or upconverting RF signals, for example comprising diplexers, front end RF amplifiers, mixers, filters, voltage controlled oscillators and the like, the activation of part or all of which may be activated in accordance with embodiments of the present invention.

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the signaling flow diagram illustrated in FIG. 2. For example, in certain embodiments, apparatus 10 may be controlled by memory 14 and processor 12 to perform one or more of the steps performed by the eNB 202 illustrated in FIG. 2. In some embodiments, for instance, apparatus 10 may be configured to perform a process for faster RF activation.

For instance, in some embodiments, apparatus 10 may be controlled by memory 14 and processor 12 to transmit a RRC connection release message to a UE that may be in CA/DC mode. The connection release message may include an indication for the UE to keep measuring candidate SCell(s). Subsequently, for example when DL data is available for transmission, apparatus 10 may be controlled by memory 14 and processor 12 to transmit a message to the UE. In one embodiment, the message may indicate to the UE to turn on a $2^{nd}$ or additional RF chain. For example, apparatus 10 may indicate to the UE to turn on the additional or $2^{nd}$ RF chain for the best measured candidate SCell(s). Alternatively, the message may indicate to the UE that apparatus 10 intends to use CA/DC or may even more specifically indicate which carrier apparatus 10 intends to use. Such an indication may then be used by the UE to decide to turn on additional RF chain. In certain embodiments, the message may be a paging message or may be another type of message according to other embodiments.

In one example, broadcasted information (e.g., in system information indication SIBS) may contain an indication of when the UE can apply, for example, information on (re)activating the RF. The UE may then be able to activate the additional RF chain, and to tune and synchronize to the best measured candidate SCell(s) on the instructed carrier.

In certain embodiments, apparatus 10 may also be controlled by memory 14 and processor 12 to receive a RA preamble from the UE, and to transmit a RAR. During or immediately after connection setup, apparatus 10 may be controlled by memory 14 and processor 12 to receive, from the UE, a report on the cell(s) it has measured. For example, in one embodiment, apparatus 10 may receive, from the UE, a RRC connection request that includes an indication of candidate SCell measurements. According to certain embodiments, apparatus 10 may receive, from the UE, an explicit indication of the candidate cell(s), such as any cell above a given threshold, or may receive an implicit indication of the best reported cell. In an embodiment, apparatus 10 may be further controlled by memory 14 and processor 12 to set up and complete a RRC connection procedure with the UE. In an embodiment, apparatus 10 may also be controlled by memory 14 and processor 12 to receive, from the UE, an indication of the availability of inter-frequency measurements in a RRC connection setup complete message or in a RRC connection resume complete message.

According to some embodiments, apparatus 10 may be controlled by memory 14 and processor 12 to perform data transmission with the UE in the PCC. In certain embodiments, apparatus 10 may also be controlled by memory 14 and processor 12 to configure the UE with the new Scell, for example, according to the reported candidate cell(s) previously received from the UE. Therefore, as a result of example embodiments, apparatus 10 knows that the UE is ready to be scheduled sooner in the candidate cell(s). In addition, apparatus 10 is able to receive CQI report immediately and schedule the UE in the SCell without delay due to the early indication to the UE to power on the RF and synchronize to the cell.

Additionally, in another embodiment, the indication from apparatus 10, to the UE, to turn on the additional RF may contain a quality condition (e.g., RSRP threshold) such that the UE turns on the RF only if it has found a candidate SCell that fulfils the given quality condition. Then, during the subsequent connection setup, apparatus 10 may receive, from the UE, an indication if it did not turn on the RF or an implicit report that all of the candidate cells are below the given quality condition.

Figure 4B:
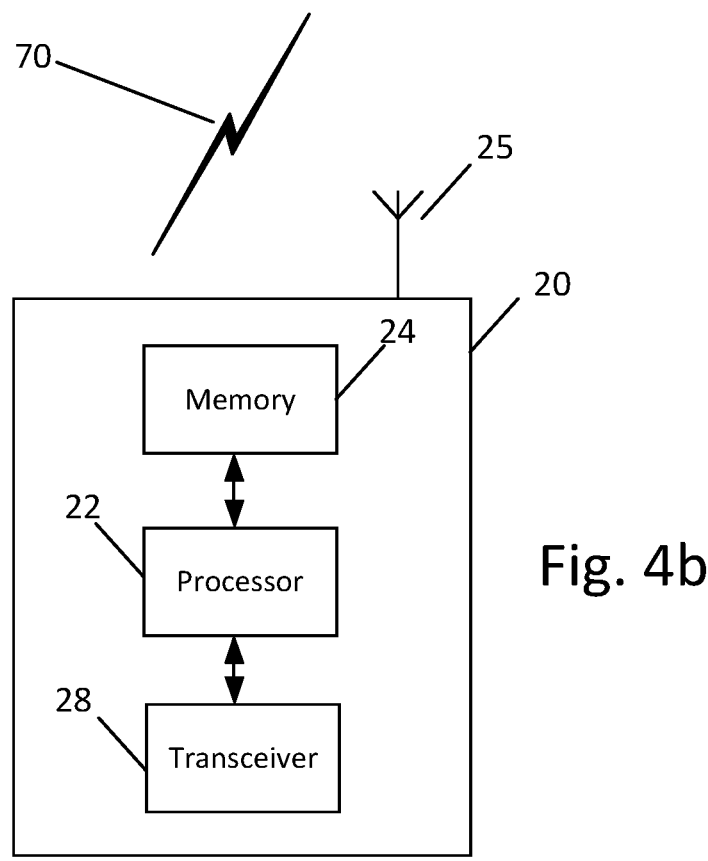
FIG. 4b illustrates an example block diagram of an apparatus, according to another embodiment.

FIG. 4*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, a connected car, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For instance, in some embodiments, apparatus 20 may be configured to perform one or more of the processes depicted in any of the flow charts or block diagrams described herein, such as the signaling flow diagram illustrated in FIG. 2. As an example, apparatus 20 may be configured for early activation of a $2^{nd}$ or more additional RF chain(s).

According to some embodiments, apparatus 20 may initially be performing data transmission or receipt with a network, such as a LTE or NR network. In an embodiment, after the data transfer is complete, apparatus 20 may be controlled by memory 24 and processor 22 to release its connection and/or to receive a RRC connection release message from a network node (e.g., an eNB). The connection release message, received from the network node, may include an indication for apparatus 20 to keep measuring SCell(s). As a result, apparatus 20 may be controlled by memory 24 and processor 22 to start to measure candidate SCell(s) (or corresponding carriers) according to a configuration received before connection release. According to certain embodiments, apparatus 20 may be controlled to measure the SCell(s) according to the given inter-frequency measurement configuration, specific for detecting potential candidate SCells.

In certain embodiments, apparatus 20 may be further controlled by memory 24 and processor 22 to receive, from the network node, a message. In one embodiment, the message may indicate to apparatus 20 to turn on a $2^{nd}$ or additional RF chain(s). For example, the network node may indicate to apparatus 20 to turn on the additional RF chain(s) for the best candidate SCell(s) that it has measured. In another embodiment, the message may indicate to apparatus 20 that the network node intends to use CA/DC or may even more specifically indicate which carrier the network node intends to use. Such an indication may then be used by apparatus 20 to decide to turn on an additional RF chain. In certain embodiments, the message may be a paging message or may be another type of message according to other embodiments.

In one example, broadcasted information (e.g., in system information indication SIBS) may contain an indication of when apparatus 20 can apply, for example, information on (re)activating the RF. According to an embodiment, apparatus 20 may then be controlled by memory 24 and processor 22 to activate the additional RF chain(s), and to tune and synchronize to the best measured candidate SCell(s) on the instructed carrier.

According to some embodiments, apparatus 20 may also be controlled by memory 24 and processor 22 to transmit a RA preamble to the network node, and to receive a RAR from the network node. During or immediately after connection setup, apparatus 20 may be controlled by memory 24 and processor 22 to report the cell(s) it has measured to the network node. For example, apparatus 20 may be controlled by memory 24 and processor 22 to transmit a RRC connection request, to the network node, including an indication of candidate SCell measurements. According to certain embodiments, apparatus 20 may be controlled by memory 24 and processor 22 to explicitly indicate the candidate cell(s), such as any cell above a given threshold, or to implicitly indicate the best reported cell. According to some examples, apparatus 20 may be controlled by memory 24 and processor 22 to set up and complete RRC connection with the network node. In an embodiment, apparatus 20 may be controlled by memory 24 and processor 22 to indicate the availability of inter-frequency measurements in a RRC connection setup complete message or in a RRC connection resume complete message.

In some embodiments, apparatus 20 may be controlled by memory 24 and processor 22 to perform data transmission in the primary component carrier (PCC). According to an embodiment, apparatus 20 may then be controlled by memory 24 and processor 22 to be configured with the new Scell, for example, according to the reported candidate cell(s). As a result of example embodiments, the network node knows that the UE is ready to be scheduled sooner in the candidate cell(s). Also, apparatus 20 is able to send channel quality indicator (CQI) report immediately and be scheduled in the SCell, without delay due to the early powering on of the RF and synchronizing to the cell.

Additionally, in another embodiment, the network indication may contain a quality condition (e.g., reference signal received power (RSRP) threshold) so that the apparatus 20 turns on the RF only if it has found a candidate SCell that fulfils the given quality condition. Then, during the connection setup, apparatus 20 may indicate if it did not turn on the RF or implicitly report that all of the candidate cells are below the given quality condition. Further, in an embodiment, if apparatus 20 is not configured with a SCell after all (and therefore does not need the $2^{nd}$ RF), apparatus 20 may be controlled by memory 24 and processor 22 to power off the $2^{nd}$ or additional RF after a certain amount of time lapses.

Figure 5A:
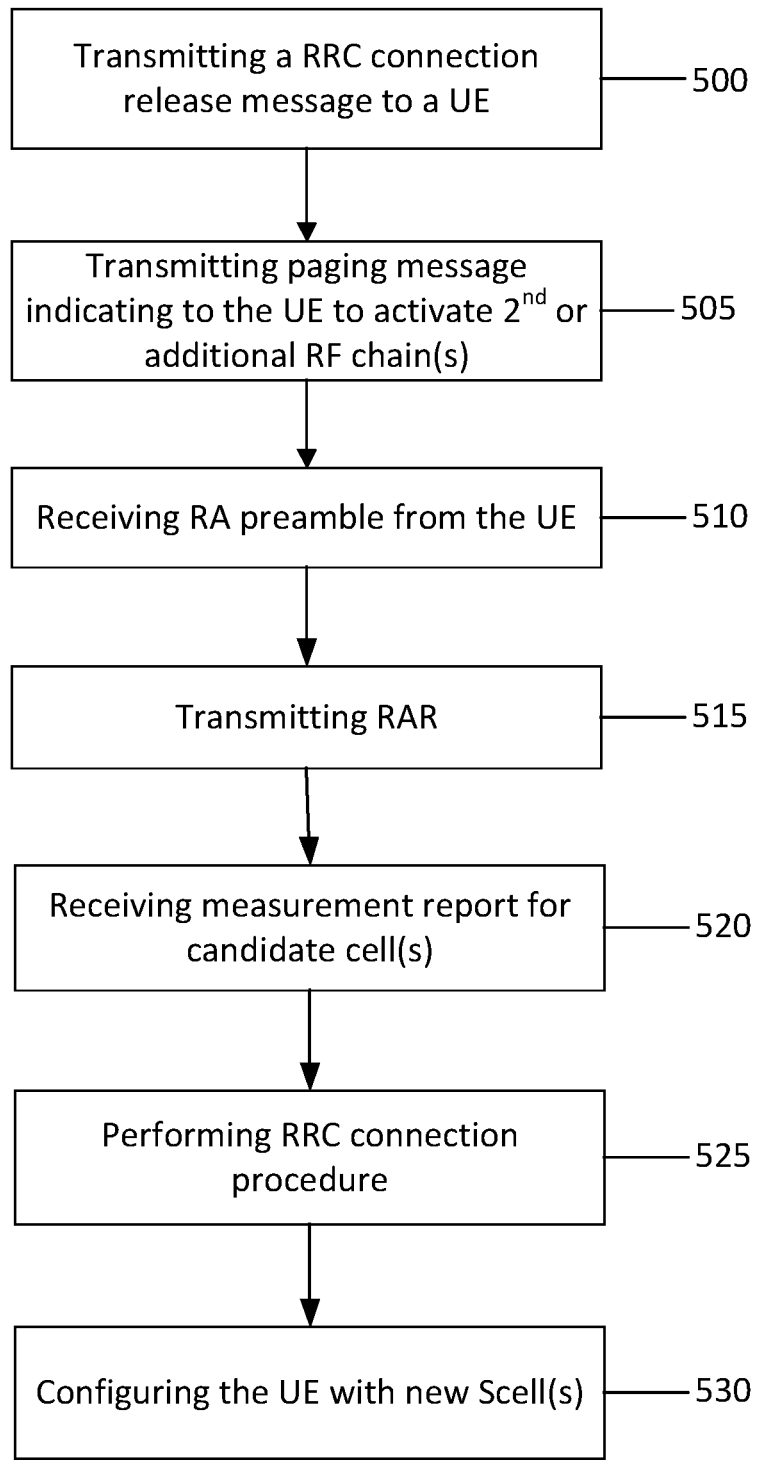
FIG. 5a illustrates an example flow diagram of a method, according to one embodiment.

FIG. 5a illustrates an example flow diagram of a method for faster RF activation, according to one embodiment. In certain embodiments, the flow diagram of FIG. 5a may be performed by a network node, such as an access point, base station, node B, eNB, gNB, or any other access node. As illustrated in the example of FIG. 5a, the method may include, at 500, transmitting a RRC connection release message to a UE that may be in CA/DC mode. The connection release message may include an indication for the UE to continue measuring candidate SCell(s). In an embodiment, for example when DL data is available for transmission, the method may include, at 505, transmitting a message to the UE. In an embodiment, the message may indicate to the UE to turn on a $2^{nd}$ or additional RF chain(s). For example, the message may indicate to the UE to turn on the additional or $2^{nd}$ RF chain for the best measured candidate SCell(s). In another embodiment, the message may indicate to the UE that the network node intends to use CA/DC or may even more specifically indicate which carrier the network node intends to use. Such an indication may then be used by the UE to decide to turn on additional RF chain. In certain embodiments, the message may be a paging message or may be another type of message according to other embodiments.

In one example, broadcasted information (e.g., in system information indication SIBS) may contain an indication of when the UE can apply, for example, information on (re)activating the RF. The UE may then be able to activate the additional RF chain(s), and to tune and synchronize to the best measured candidate SCell(s) on the instructed carrier.

In certain embodiments, the method may also include, at 510, receiving a RA preamble from the UE, and transmitting a RAR at 515. During or immediately after connection setup, the method may include, at 520, receiving, from the UE, a measurement report for the cell(s) it has measured. For example, in one embodiment, the receiving 520 may include receiving, from the UE, a RRC connection request that includes an indication of candidate SCell measurements. According to certain embodiments, the receiving 520 may include receiving, from the UE, an explicit indication of the candidate cell(s), such as any cell above a given threshold, or receiving an implicit indication of the best reported cell. In an embodiment, the method may also include, at 525, performing a RRC connection procedure in order to set up and complete a RRC connection with the UE. In an embodiment, the performing 525 of the RRC connection procedure may include receiving, from the UE, an indication of the availability of inter-frequency measurements in a RRC connection setup complete message or in a RRC connection resume complete message.

According to some embodiments, the method may then include, at 530, configuring the UE with the new Scell, for example, according to the reported candidate cell(s) previously received from the UE. Hence, as a result of example embodiments, the network node is able to know sooner that the UE is ready to be scheduled in the candidate cell(s). In addition, the network node is able to receive CQI report immediately and schedule the UE in the SCell without delay due to the earlier indication to the UE to power on the RF and synchronize to the cell.

Additionally, in another embodiment, the indication sent in the paging message, at 505, to turn on the additional RF may contain a quality condition (e.g., RSRP threshold) such that the UE turns on the RF only if it has found a candidate SCell that fulfils the given quality condition. Then, during the subsequent connection setup, the method may optionally include receiving, from the UE, an indication if it did not turn on the RF or an implicit report that all of the candidate cells are below the given quality condition.

Figure 5B:
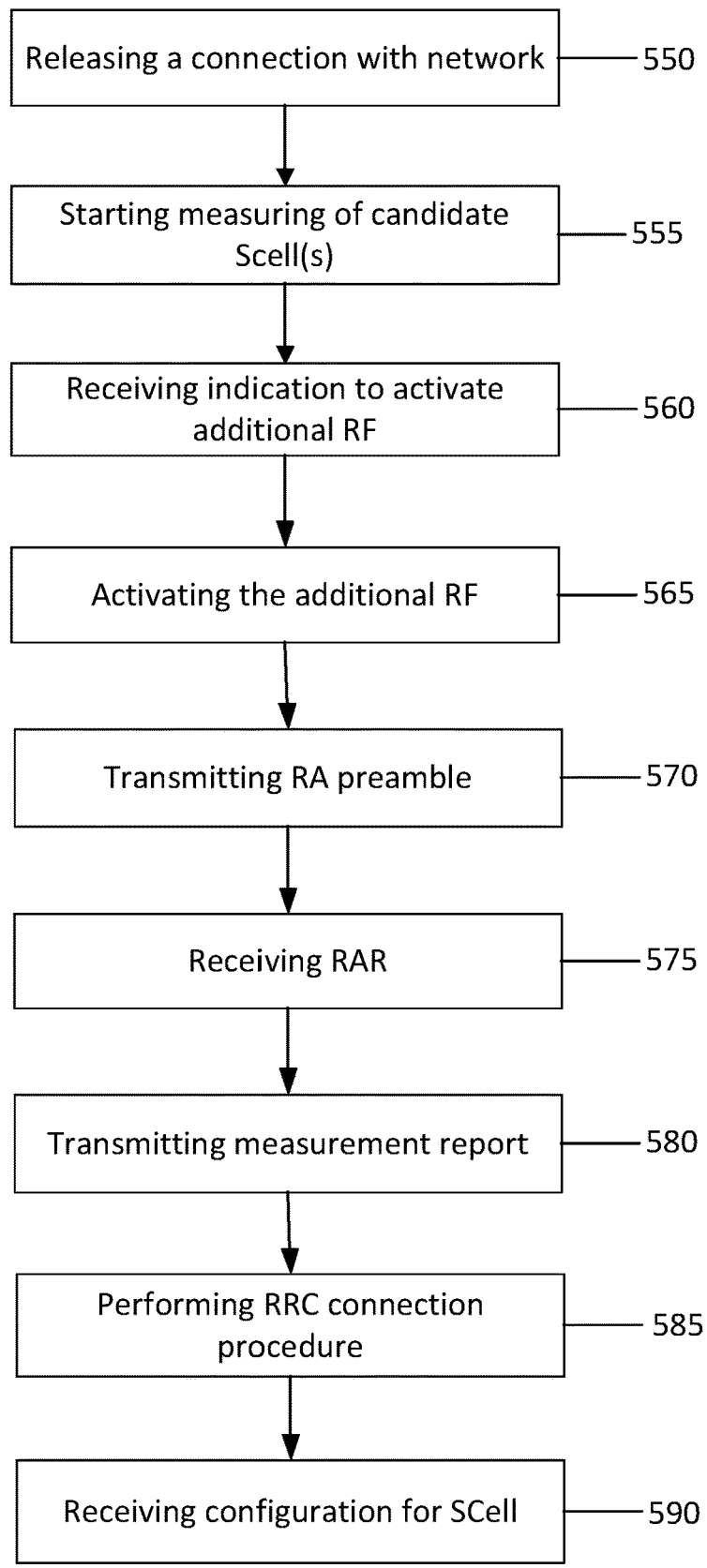
FIG. 5b illustrates an example flow diagram of a method, according to another embodiment.

FIG. 5b illustrates an example flow diagram of a method for faster RF activation, according to one embodiment. In certain embodiments, the flow diagram of FIG. 5b may be performed, for example, by a UE, mobile station, mobile equipment, IoT device, or the like. For instance, in one embodiment, the method of FIG. 5b may be performed by a UE in CA/DC mode.

As illustrated in the example of FIG. 5b, the method may include, at 550, after data transfer, releasing a connection with the network and/or receiving a RRC connection release message from a network node (e.g., an eNB). The connection release message, received from the network node, may include an indication for the UE to continue measuring SCell(s). As a result, the method may also include, at 555, starting the measuring of candidate SCell(s) (or corresponding carriers) according to a configuration received before connection release. According to certain embodiments, the measuring 555 may include measuring the SCell(s) according to the given inter-frequency measurement configuration, specific for detecting potential candidate SCells.

In certain embodiments, the method may also include, at 560, receiving, from the network node, a message. In an embodiment, the message may indicate to the UE to activate a $2^{nd}$ or additional RF chain(s). For example, the receiving 560 may include receiving an indication to turn on the $2^{nd}$/additional RF chain(s) for the best candidate SCell(s) that the UE has measured. In another embodiment, the message may indicate to the UE that the network node intends to use CA/DC or may even more specifically indicate which carrier the network node intends to use. Such an indication may then be used by the UE to decide to turn on additional RF chain. In certain embodiments, the message may be a paging message or may be another type of message according to other embodiments.

In one example, broadcasted information (e.g., in system information indication SIBS) may contain an indication of when the UE can apply, for example, information on (re) activating the RF. According to an embodiment, the method may then include, at 565, activating the additional RF chain(s), and tuning and synchronizing to the best measured candidate SCell(s) on the instructed carrier.

According to some embodiments, the method may further include, at 570, transmit a RA preamble to the network node, and receiving, at 575, a RAR from the network node. During or immediately after connection setup, the method may include, at 580, transmitting a measurement report for the cell(s) it has measured to the network node. For example, the transmitting 580 may include transmitting a RRC connection request, to the network node, including an indication of candidate SCell measurements. According to certain embodiments, the transmitting 580 may include explicitly indicating the candidate cell(s), such as any cell above a given threshold, or implicitly indicating the best reported cell. According to some examples, the method may include, at 585, performing a RRC connection procedure by setting up and completing a RRC connection with the network node. In an embodiment, the method may optionally include indicating the availability of inter-frequency measurements in a RRC connection setup complete message or in a RRC connection resume complete message.

In some embodiments, the method may include performing data transmission in the primary component carrier (PCC). According to an embodiment, the method may include, at 590, receiving SCell configuration, for example, based on the reported candidate cell(s). As a result of this example method, the UE is able to send channel quality indicator (CQI) report immediately and be scheduled in the SCell, without delay due to the early powering on of the RF and synchronizing to the cell.

Additionally, in another embodiment, the receiving 560 may include receiving an indication that contains a quality condition (e.g., reference signal received power (RSRP) threshold) so that the UE activates the additional RF only if it has found a candidate SCell that fulfils the given quality condition. Then, during the connection setup, the UE may indicate, to the network node, if it did not turn on the RF or implicitly report that all of the candidate cells are below the given quality condition. Further, in an embodiment, if the UE not configured with a SCell after all (and therefore does not need the $2^{nd}$ RF), the method may include powering off the $2^{nd}$ or additional RF after a certain amount of time lapses.

Therefore, certain example embodiments provide several technical improvements, enhancements, and/or advantages. Various example embodiments are able to faster RF activation, which reduces setup time when a UE moves from an idle/inactive state to a connected state. As a result of some embodiments, there is a shorter delay in accessing the small or SCell, since there is no warm-up time in waking-up the UE. Indeed, according to an embodiment, after the connection is setup, the UE is immediately ready to receive on the small cell. Additionally, according to certain embodiments, there is no interruption and no CQI reporting delay.

As such, example embodiments can improve performance, latency, and/or throughput of networks and network nodes including, for example, access points, base stations/eNBs/gNBs, and mobile devices or UEs. Accordingly, the use of certain example embodiments result in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One embodiment is directed to a method that may include transmitting, by a network node, a message to a UE. The message may indicate to the UE to activate a $2^{nd}$ or additional RF chain(s), may indicate that the network node intends to use CA/DC, or may specifically indicate which carrier the network node intends to use. The method may then include receiving, from the UE, a measurement report for candidate SCell(s) it has measured. Based on the measurement report, the method may also include configuring the UE with the best candidate SCell(s).

Another embodiment is directed to an apparatus that may include at least one processor and at least one memory comprising computer program code. The at least one memory and computer program code may be configured, with the at least one processor, to cause the apparatus at least to transmit a message to a UE. The message may indicate to the UE to activate a $2^{nd}$ or additional RF chain(s), may indicate that the apparatus intends to use CA/DC, or may specifically indicate which carrier the apparatus intends to use. The at least one memory and computer program code may be further configured, with the at least one processor, to cause the apparatus at least to receive, from the UE, a measurement report for candidate SCell(s) it has measured and, based on the measurement report, to configure the UE with the best candidate SCell(s).

Another embodiment is directed to an apparatus that may include transmitting means for transmitting a message to a UE. The message may indicate to the UE to activate a $2^{nd}$ or additional RF chain(s), may indicate that the apparatus intends to use CA/DC, or may specifically indicate which carrier the apparatus intends to use. The apparatus may also include receiving means for receiving, from the UE, a measurement report for candidate SCell(s) it has measured. The apparatus may further include configuring means for configuring the UE, based on the measurement report, with the best candidate SCell(s).

Another embodiment is directed to a method that may include receiving, from a network node, a message at a UE. The message may indicate to the UE to activate a $2^{nd}$ or additional RF chain(s), may indicate that the network node intends to use CA/DC, or may specifically indicate which carrier the network node intends to use. The method may then include activating the additional RF chain(s), for example based on the indication received from the network node, and transmitting a measurement report for candidate cell(s) that have been measured to the network node. The method may further include receiving a configuration for best candidate SCell(s).

Another embodiment is directed to an apparatus that may include at least one processor and at least one memory comprising computer program code. The at least one memory and computer program code may be configured, with the at least one processor, to cause the apparatus at least to receive, from a network node, a message. The message may indicate to the apparatus to activate a $2^{nd}$ or additional RF chain(s), may indicate that the network node intends to use CA/DC, or may specifically indicate which carrier the network node intends to use. The at least one memory and computer program code may be further configured, with the at least one processor, to cause the apparatus at least to activate the additional RF chain(s), for example based on the indication received from the network node, and to transmit a measurement report for candidate cell(s) that have been measured to the network node, and to receive a configuration for best candidate SCell(s).

Another embodiment is directed to an apparatus that may include receiving means for receiving, from a network node, a message. The message may indicate to the apparatus to activate a $2^{nd}$ or additional RF chain(s), may indicate that the network node intends to use CA/DC, or may specifically indicate which carrier the network node intends to use. The apparatus may then include activating means for activating the additional RF chain(s), for example based on the indication received from the network node, and transmitting means for transmitting a measurement report for candidate cell(s) that have been measured to the network node, and receiving means for receiving a configuration for best candidate SCell(s).

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

We claim:

1. A method, comprising:
    transmitting, by a network node, a connection release message to a user equipment, wherein the connection release message comprises an indication causing the user equipment to start measurements of one or more additional radio frequency chains of at least one secondary cell; and
    during or immediately after a connection setup or connection resume message, receiving from the user equipment an indication of availability of the measurements of one or more additional radio frequency chains of the at least one secondary cell, wherein the indication of availability of the measurements of the one or more additional radio frequency chains of the at least one secondary cell is received in a radio resource control connection resume or radio resource control connection complete message; and based at least on the indication, transmitting, by the network node, a message to indicate to the user equipment to activate the one or more additional radio frequency chains.

2. The method according to claim 1, wherein the at least one secondary cell are measured according to a given inter-frequency measurement configuration for detecting potential candidate secondary cells.

3. The method according to claim 1, further comprising transmitting the message to further indicate a quality condition for activating the one or more additional radio frequency chains.

4. The method according to claim 1, wherein starting the measurements comprises the one or more additional radio frequency chains of the at least one secondary cell are activated to perform an inter-frequency measurement configuration according to measurement gaps to detect potential candidate secondary cells.

5. The method according to claim 4, wherein the measurement gaps enable receiving, transmitting, and enabling at a same time the measurements of the one or more additional radio frequency chains based on the inter-frequency measurement configuration.

6. The method according to claim 1, wherein the indication causes the user equipment to drop all carrier aggregation or dual connectivity configurations and transition from a carrier aggregation or dual connectivity state to a single carrier operation mode.

7. An apparatus, comprising:
at least one processor; and
at least one memory comprising computer program code, the at least one memory and computer program code configured, with the at least one processor, to cause the apparatus at least to:
transmit a connection release message to a user equipment, wherein the connection release message comprises an indication for the user equipment to start measurements of one or more additional radio frequency chains of at least one secondary cell after connection release; and
during or immediately after a connection setup or connection resume message, receive from the user equipment an indication of availability of the measurements of the one or more additional radio frequency chains of the at least one secondary cell, wherein the indication of availability of the measurements of the one or more additional radio frequency chains of the at least one secondary cell is received in a radio resource control connection resume or radio resource control connection complete message; and
based on the indication, transmit a message to indicate to the user equipment to activate the one or more additional radio frequency chains.

8. The apparatus according to claim 7, wherein the at least one secondary cell are measured according to a given inter-frequency measurement configuration for detecting potential candidate secondary cells.

9. The apparatus according to claim 7, wherein the at least one memory and computer program code are configured, with the at least one processor, to cause the apparatus at least to transmit the message to further indicate a quality condition for activating the one or more additional radio frequency chains.

10. The apparatus according to claim 7, wherein the at least one memory and computer program code are configured, with the at least one processor, to cause the apparatus at least to transmit a message to the user equipment indicating that the apparatus intends to at least one of use one of carrier aggregation or dual connectivity or indicate a carrier the apparatus intends to use.

11. The apparatus according to claim 7, wherein the at least one memory and computer program code are configured, with the at least one processor, to cause the apparatus at least to receive from the user equipment results of the measurements of the at least one secondary cell; and configure the user equipment with a new secondary cell based on the results of the measurements of the at least one secondary cell.

12. A method, comprising:
receiving, by a user equipment, a connection release message from a network, wherein the connection release message comprises an indication for the user equipment to start measuring at least one secondary cell after connection release;
receiving from the network a message to indicate to the user equipment to activate one or more additional radio frequency chains; and
during or immediately after a connection setup or connection resume message, transmitting an indication of availability of measurements of one or more additional radio frequency chains of the at least one secondary cell, wherein the indication of availability of the measurements of the one or more additional radio frequency chains of the at least one secondary cell is transmitted in a radio resource control connection resume complete message; and
based on the indication, receiving from the network an indication to activate the one or more additional radio frequency chains.

13. The method according to claim 12, further comprising measuring the at least one secondary cell according to a given inter-frequency measurement configuration for detecting potential candidate secondary cells.

14. An apparatus, comprising:
at least one processor; and
at least one memory comprising computer program code, the at least one memory and computer program code configured, with the at least one processor, to cause the apparatus at least to:
receive a connection release message from a network, wherein the connection release message comprises an indication for the user equipment to start measuring at least one secondary cell after connection release;
receive from the network a message to indicate to the apparatus to activate one or more additional radio frequency chains; and
during or immediately after a connection setup or connection resume message, transmitting an indication of availability of the measurements of the one or more additional radio frequency chains of the at least one secondary cell, wherein the indication of availability of measurements of the one or more additional radio frequency chains of the at least one secondary cell is transmitted in a radio resource control connection resume complete message; and based on the indication, receive from the network an indication to activate the one or more additional radio frequency chains.

15. The apparatus according to claim 14, wherein the at least one memory and computer program code are configured, with the at least one processor, to cause the apparatus at least to measure the at least one secondary cell according to a given inter-frequency measurement configuration for detecting potential candidate secondary cells.

16. The apparatus according to claim 14, wherein the at least one memory and computer program code are configured, with the at least one processor, to cause the apparatus at least to receive a quality condition and activate the one or more additional radio frequency chains at least conditioned on whether at least one best measured candidate secondary cell fulfills the quality condition.

17. The apparatus according to claim 14, wherein the at least one memory and computer program code are configured, with the at least one processor, to cause the apparatus at least to, in response to reception of the indication to activate one or more additional radio frequency chains, activate the one or more additional radio frequency chains and tune and synchronize the one or more additional radio frequency chains to at least one best measured candidate secondary cell.

18. The apparatus according to claim 14, wherein the activation of the one or more additional radio frequency chains comprises activation of the one or more additional radio frequency chains earlier than at least one of configuration or activation of the at least one best measured candidate secondary cell.

19. The apparatus according to claim 14, wherein the at least one memory and computer program code are configured, with the at least one processor, to cause the apparatus at least to receive a message indicating that the network intends to at least one of use one of carrier aggregation or dual connectivity or indicate a carrier the network intends to use.

20. The apparatus according to claim 14, wherein the at least one memory and computer program code are configured, with the at least one processor, to cause the apparatus at least to receive a configuration from the network with a new secondary cell based on the results of the measurements of the at least one secondary cell.

\* \* \* \* \*